United States Patent [19]

Olsen et al.

[11] Patent Number: 4,741,823

[45] Date of Patent: May 3, 1988

[54] FLOW CONTROL MANIFOLD FOR CROSS-FLOW MEMBRANE SYSTEM

[75] Inventors: Douglas L. Olsen; Paul D. Osmundson, both of Eden Prairie; Keith G. McLaughlin, Golden Valley, all of Minn.

[73] Assignee: Osmonics, Inc., Minnetonka, Minn.

[21] Appl. No.: 945,910

[22] Filed: Dec. 23, 1986

[51] Int. Cl.$^4$ .............................................. B01D 13/00
[52] U.S. Cl. .................................. 210/96.2; 210/137; 210/195.2
[58] Field of Search ............... 210/257.2, 195.2, 321.1, 210/85, 90, 137, 96.2

[56] References Cited

U.S. PATENT DOCUMENTS 3,679,055  7/1972  Clark et al. .................. 210/257.2 X
4,347,132  8/1982  Davis .......................... 210/257.2 X
4,482,456  11/1984  Grayson ....................... 210/257.2 X Primary Examiner—Frank Spear
Attorney, Agent, or Firm—Dorsey & Whitney

[57] ABSTRACT

A cross flow membrane system for separating feed water into a concentrate stream and a permeate stream which includes a cross-flow membrane module, a pump for pressurizing feed water for supply to the module and a flow control manifold block having a permeate, a concentrate bore and a concentrate orifice for controlling the flow of concentrate from the system and the operating pressure within the cross-flow membrane module. The manifold block simplifies the manufacture, operation and maintenance of the system and allows elimination of many of the tubes, hoses and valves which are commonly required in prior art systems.

20 Claims, 2 Drawing Sheets

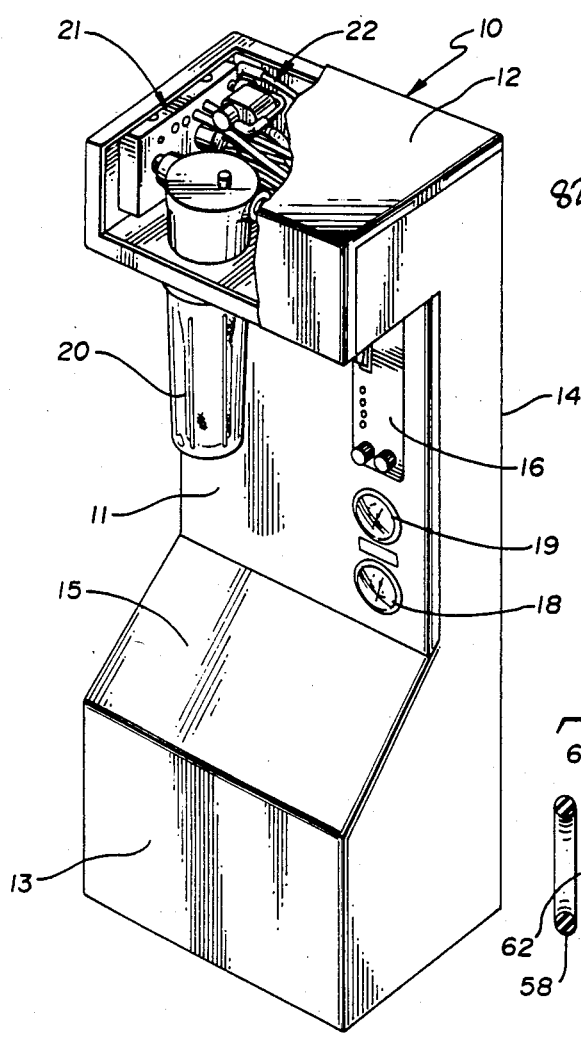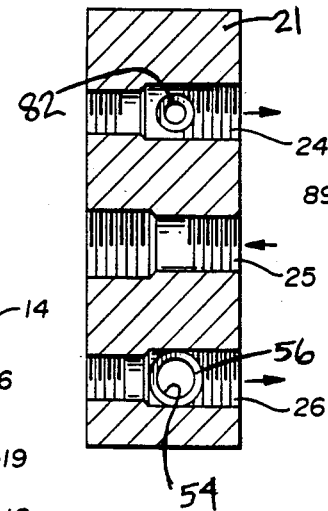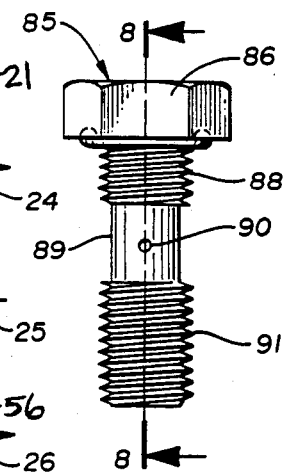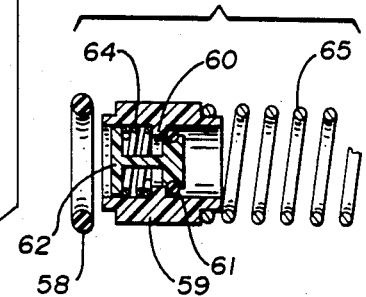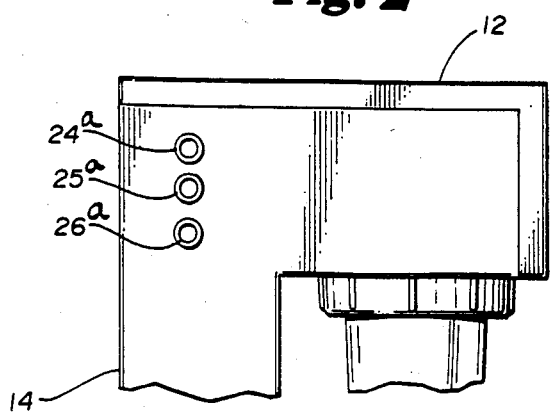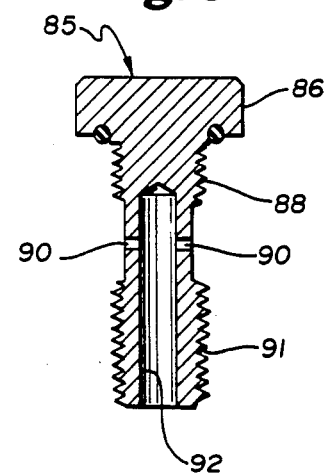

4,741,823

FLOW CONTROL MANIFOLD FOR CROSS-FLOW MEMBRANE SYSTEM

BACKGROUND OF THE INVENTION

The present invention relates generally to an improved cross-flow membrane system for separating water or other fluids into a permeate stream and a concentrate stream, and more particularly to a flow control manifold for a cross-flow membrane system, which greatly simplifies the structure of the system, renders the same much less expensive and provides for improved operation.

Cross-flow membrane systems have existed in the art for many years. In general, cross-flow membrane filtration systems involve the removal of ionic, organic and suspended impurities from water or other fluids by passing such fluid, under pressure, across a membrane. As referred to herein, a cross-flow membrane system includes a feed water inlet, a concentrate outlet and a pump or other means for pressurizing the feed water and exposing it to one surface of a semipermeable membrane. Typical cross-flow membrane systems include reverse osmosis (RO), microfiltration (MF) and ultrafiltration (UF). Because of the pore size and other characteristics of the membrane, various ionic, organic and other impurities in the feed water or fluid are prevented from passing through the membrane. Thus, that portion of the water or other fluid which is able to pass through the membrane is relatively free of any of such impurities. The portion of the fluid which passes through the membrane is called the permeate. The portion of the fluid, with impurities therein, which is rejected by the membrane is referred to as the concentrate. Following passage of the water or other fluid through the cross-flow module, the respective permeate and concentrate streams are directed for further use or processing. In many cross-flow membrane systems, a portion of the concentrate stream is recycled.

Although the basic plumbing and hydraulic operation of a cross-flow membrane system appears to be quite simple and uncomplicated, a relatively large number of valves, filters, connections, hoses, conductivity probes, flow control orifices, etc., are needed for operation of such a system. Also, the successful long-term operation and economical design of a cross-flow membrane system includes the need to carefully control and regulate fluid flow rates and pressure via valves and orifices. In the past, these elements have been individually positioned within the system, with each element being connected with its operatively associated elements via various hoses, fittings, etc. As a result, such cross-flow membrane systems in the past have been quite cluttered and complicated and relatively expensive to manufacture and maintain.

Accordingly, there is a need in the art for a cross-flow membrane system which is relatively simple in construction, but which still provides all of the elements needed to have a fully operative system.

SUMMARY OF THE INVENTION

In contrast to the prior art, the present invention provides for an improved cross-flow membrane system, and more particularly to a flow control manifold for a reverse osmosis system which greatly simplifies the manufacture, operation and maintenance of such a system. In general, the preferred RO system of the present invention includes at least one, but preferably a plurality of, reverse osmosis or RO modules which may be operatively connected with one another in any manner which is conventional in the art. The system of the present invention also includes a flow control manifold block which incorporates much of the plumbing and other operative elements of the system, including the various inlet, concentrate, permeate and recycle conduits as well as the various check-valves, flow control orifices, conductivity probes, valves, etc. A further feature of the preferred embodiment of the present invention includes incorporation of a preset concentrate orifice and a preset recycle orifice in the manifold block to eliminate skilled monitoring, maintenance or adjustment of the system.

Accordingly, it is an object of the present invention to provide an improved cross-flow membrane system which is less complicated, less expensive and easier to manufacture, operate and maintain than prior systems.

Another object of the present invention is to provide an improved cross-flow membrane system incorporating a flow control manifold which incorporates the various tubes, hoses, valves, flow control orifices, conductivity probes, etc. of the system.

Another object of the present invention is to provide a flow control manifold for a cross-flow membrane system having an improved flow control means incorporated therein and which further includes the various operative elements of the system.

A further object of the present invention is to provide a flow control manifold block for a cross-flow membrane system comprising preset concentrate and recycle orifices.

These and other objects of the present invention will become apparent with reference to the drawings, the description of the preferred embodiment and the appended claims.

DESCRIPTION OF THE DRAWINGS

FIG. 1 is a pictorial view, with portions broken away, of an RO system incorporating the flow control manifold block in accordance with the present invention.

FIG. 2 is an elevational view of a portion of one side of the RO system illustrated in FIG. 1.

FIG. 5 is a sectional view of the flow control manifold block of the present invention as viewed along the section line 5—5 of FIG. 3.

FIG. 6 is a broken apart view, partially in section, of the integral check valve disposed within the flow control manifold block illustrated in FIG. 3.

FIG. 7 is an elevational side view of the flow control member of the type used to control the concentrate recycle and the concentrate outlet in the RO system of the present invention.

FIG. 8 is a sectional view as viewed along the section line 8—8 of FIG. 7.

DESCRIPTION OF THE PREFERRED EMBODIMENT

Figure 3:
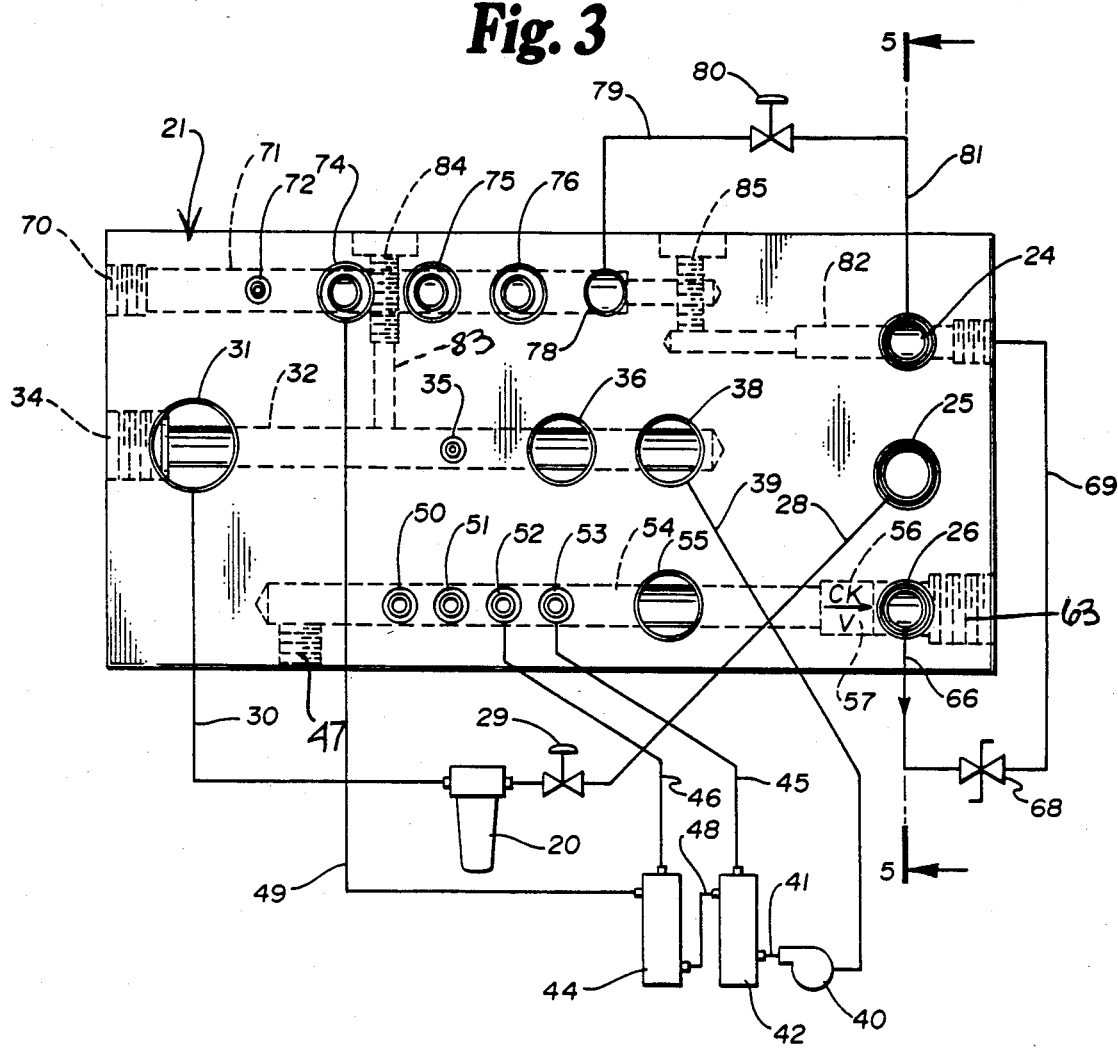
FIG. 3 is an elevational front view, with portions illustrated schematically, of the flow control manifold block incorporated within the RO system of the present invention.

Reference is first made to FIGS. 1 and 2 illustrating the cross-flow membrane system of the present invention. For purposes of describing the preferred embodiment, the cross-flow membrane system is a reverse osmosis (RO) system although the invention is applicable to other cross-flow membrane systems as well. As illustrated in FIG. 1, the RO system includes a cabinet housing 10 comprising a pair of side panels 14, a lower front panel 13, an intermediate front panel 11, and a panel 15. The panel 15 has its side edges connected with portions of the panels 14 and its top and bottom edges connected with edge portions of the panels 11 and 13. The cabinet also includes a top, removable housing member 12 which covers the top and upper front portion of the cabinet 10. The housing member 12 includes a top portion and a portion designed to connect with edge portions of the side panels 14. Although not specifically illustrated, the member 12 includes means removably connecting the panel 12 to facilitate easy removal of the same for access to the operative components of the RO system.

The front panel portion 11 includes a pair of pressure gauges 18 and 19 to visually indicate the final pressure in the RO system and the post filter feed water pressure, respectively. An instrument panel 16 is also provided which includes various switches, indicator lights for switches, transformer fuses and a monitor indicating separation efficiency of the system.

FIG. 2 illustrates a portion of the upper side surface of the reverse osmosis system cabinet. Extending through the side panel 14 from the flow control monitor block 21 (FIG. 1) is a concentrate outlet nipple 24a, a feed water supply nipple 25a and a permeate outlet nipple 26a. These nipples are threadedly connected with the corresponding ports 24, 25 and 26 in the flow control manifold block 21 illustrated generally in FIG. 1 and specifically in FIG. 3. The outer ends of these nipples 24a, 25a and 26a are threaded for connection to appropriate feed and outlet conduits (not shown). As shown in FIG. 5, the ports 24, 25 and 26 extend through the block 21 and include internal threads at each end for connection with a plug or another appropriate fitting.

Figure 4:
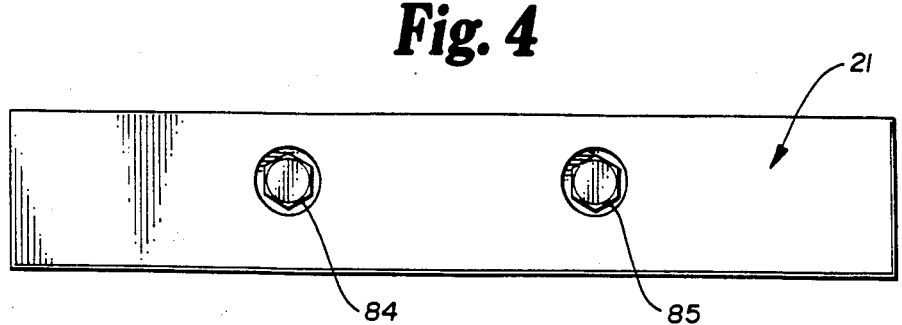
FIG. 4 is an elevational top view of the flow control manifold block illustrated in FIG. 3.

Reference is next made to FIGS. 3, 4 and 5 illustrating various views of the flow control monitor block of the present invention. As shown best in FIG. 1, this manifold block 21 is secured to the upper interior surface of one of the side panels 14 although it can be positioned at various other locations as well. This connection can be made by any conventional means such as a plurality of threaded members or mounting brackets. The preferred embodiment of the manifold block 21 comprises a solid, generally rectangular block approximately ten inches long, five inches wide and an inch and three-quarters thick and constructed of polyvinyl chloride. It is contemplated, however, that the block 21 can be of various sizes and dimensions and constructed of various other materials without deviating from the spirit of the present invention.

In general, the manifold block 21 includes a plurality of internal conduits or bores, connection ports, flow control valves or orifices, check valves, etc. which greatly simplify the construction of the RO system of the type described in the present application. During operation, feed water enters the manifold block 21 through the nipple 25a (FIG. 1) and into the feed inlet port 25 from the back side of the block 21 as shown in FIG. 3 and the right hand side of the block as shown in FIG. 5. This feed water can be normal tap water or other water whose purification is desired for use in medical applications such as kidney dialysis, as water purification for car washes and the like or for various other applications. The feed could also include fluids other than tap water which are desired to be concentrated or purified.

After entering the block 21 through the nipple 25a and the inlet port 25, the feed water directed via an appropriate conduit 28 to an inlet solenoid valve 29 which functions to shut off flow of feed water when the machine is not operating. Accordingly, the solenoid valve 29 is operatively connected to the switch which controls operation of the RO system. After leaving the solenoid valve 29, the feed water is directed by an appropriate conduit to a prefilter 20. The prefilter 20 includes a conventional filter housing and a filter element disposed therein. In the preferred embodiment, the filter element is selected to filter out particles greater than 5 microns for the purpose of protecting the RO system components such as the pump and RO modules to reduce fouling and buildup of impurities within the system.

Following passage through the prefilter 20, the feed water is directed via the conduit 30 to the inlet port 31 disposed on the front surface of the manifold block 21. The inlet port 31 is connected with the elongated internal feed water bore 32 extending through a substantial portion of the length of the block 21. In communication with the bore 32 is an inlet or post filter pressure gauge port 35, a rejection monitor probe well 36 and a feed water outlet port 38. The pressure gauge port is connected via an appropriate conduit or tubing (not shown) to the pressure gauge 19 positioned on the front panel 11 shown in FIG. 1. This pressure gauge visually indicates the feed water pressure after it has passed through the prefilter 20 and prior to its introduction into the operative components of the RO system.

The rejection monitor probe well 36 provides a port for connection to a monitor probe for the purpose of monitoring the quality of the feed water in the bore 32. Such a monitor probe can be of any conventional type which is capable of measuring the quality of the feed water or the impurities therein for the purpose of comparing the same with the quality of the permeate which exits from the RO system. In the preferred embodiment, the monitor probe utilized is a conductivity probe which determines the quality of the feed water by measuring its conductivity. As will be described in greater detail below, the measurement of the water quality taken through the well 36 is compared with the measurement of the water quality taken through a similar monitor probe well 55 in the permeate bore 54. By comparing the values of the water quality obtained at these two locations, the purification efficiency of the system can be determined.

The feed water outlet port 38 provides a connection for the conduit 39. The conduit 39 functions to direct the feed water from the feed water bore 32 to the RO system pump 40. The pump 40 is a standard pump which functions to boost the pressure of the feed water to the pressure which is needed to force the feed water through the reverse osmosis modules or separators 42 and 44. In the preferred embodiment, the pump 40 is a conventional positive displacement pump. A nonpositive displacement pump will also work as long as the pump performs the function of boosting the pressure of the feed water to a level sufficient to operate the RO system. It should be noted that the feed water pressure existing in the bore 32 ranges between 20 and 60 psi. This inlet pressure is a result of the normal feed water pressure supplied through the feed water inlet 25 following a certain pressure drop through the filter 20. This inlet presure is also affected, to some extent, by the pressure of the recycle concentrate provided through the conduit 83. In the preferred embodiment of the present system, the pump 40 functions to boost the pressure of this incoming feed water to an operating pressure of between about 140 and 225 psi.

After passing through the pump 40, the pressurized feed water is directed via the conduit 41 to a plurality of reverse osmosis modules or separators 42, 44. In the preferred embodiment illustrated in FIG. 3, the RO modules 42, 44 are connected in series. Thus, the concentrate outlet from the first module 42 is directed via the conduit 48 and serves as the feed water to the second module 44. The concentrate from the second module 44 is directed via the conduit 49 to one of a plurality of concentrate inlet ports 74, 75 or 76 positioned in the block 21. The permeate or product outlets from the RO modules 42 and 44 are connected via respective conduits 45 and 46 to two of the four permeate inlet ports 50, 51, 52 or 53 disposed within the block 21.

It should be noted that the RO module assembly comprising the modules 42 and 44 and the various connecting conduits, etc. is conventional and can incorporate any one of a relatively large number of RO module configurations. For example, the module configuration can include only a single RO module or a plurality of such modules. In the preferred embodiment, only two such modules are shown; however, virtually any number can be utilized. Further, the preferred embodiment illustrates the RO modules 42 and 44 being connected in series, with the concentrate from the first module 42 serving as the feed inlet to the second module 44. However, the modules can also be connected so that each functions individually with feed water from the conduit 41 being provided as the inlet to each of the modules. Further, a system can incorporate any combination of the above. Regardless of the RO module assembly which is utilized, the permeate or product component from the RO assembly is directed to one of the permeate inlet ports 50–53 while the concentrate component, to the extent it is not directed to a successive module as feed, is directed to one of the concentrate inlet ports 74–76. To the extent one or more of the permeate inlet ports 50–53 or the concentrate inlet ports 74–76 are not utilized or needed because of the particular RO module configuration, they are sealed off by appropriate plugs.

As illustrated best in FIG. 3, each of the permeate inlet ports 50–53 is in communication with an elongated permeate bore 54 within the block 21. This bore 54 extends from the right hand end of the block 21 as viewed in FIG. 3 to a point past sample valve 47. The port 47 is in communication with the bore 54 and can be plugged by an appropriate plug if desired or can serve as a port for a sample valve if a sample of the combined permeate is desired. In the present embodiment, the port 47 is provided with a plug.

The bore 54 also includes a rejection monitor probe well 55 which provides access between a monitor probe and the permeate fluid within the bore 54. Similar to the monitor probe discussed above with respect to the well 36, the monitor probe connected with the well 55 can be any conventional type of monitor probe which functions to measure the quality of the water or fluid within the bore 55. Means (not shown) connect the monitor probes within the wells 36 and 55 to the instrument panel 16 on the front panel 11 (FIG. 1) so that the operator can compare the quality of the feed water measured through the well 36 with the quality of the permeate or product water as measured through the well 55. This comparison enables the user or operator to determine how well or how efficient the RO system is operating.

The right hand end of the bore 54 as viewed in FIG. 3 is provided with a permeate outlet port 26 through which the permeate exits the system. In the preferred embodiment of the present invention, the permeate is directed through the outlet port 26 and then through an outlet port nipple 26a for ultimate connection with an appropriate permeate conduit (not shown).

A check valve 57 is positioned within a check valve bore or cavity 56 located near one end of the permeate bore 54 to prevent back flow into the bore 54 and back into the RO modules 42 and 44. This check valve is an integral check valve which is retained within the cavity by the plug 63 threadedly received within an end of the bore 54. The detailed construction of the integral check valve 57 is illustrated best in FIG. 6.

With reference to FIG. 6, the check valve includes an outer sleeve member 59 having an annular inwardly projecting rib 60. An O-ring 58 forms a seal between an end of the sleeve 59 and the shoulder portion formed between the check valve cavity 56 and the bore 54. A valve stem 62 is provided within the sleeve 59 and is biased in a closed position by the coil spring 64. An O-ring seal is provided between a sealing surface formed on the right hand end of the stem 62 as viewed in FIG. 6 and a portion of the annular shoulder 60. The entire check valve 57 is retained within the cavity 56 via the coil spring 65 which in turn is retained by the plug 63. The check valve 57 functions to permit permeate flow from the bore 54 to the permeate outlet 26, but to prevent permeate or other fluid from flowing back through the system into the bore 54 and ultimately into the RO modules 42 and 44.

With reference again to FIG. 2, the concentrate inlet ports 74–76 are in communication with an elongated concentrate bore 71 extending in a direction generally parallel to the feed inlet bore 32 and the permeate bore 54. Also positioned in communication with the concentrate bore 71 is a pressure gauge port 72. This port 72 provides connection to the pressure gauge 18 positioned on the panel 11 (FIG. 1) for the purpose of measuring and visually indicating the pressure in the concentrate bore 71. Because the bore 71 is connected directly to the concentrate outlet of one or more of the RO modules 42 and 44, the pressure as measured through the port 72 is a close approximation of the actual operating pressures within the modules 42 and 44.

The concentrate bore 71 is also provided with a recycle orifice member 84 and a concentrate orifice 85. The recycle orifice member 84 functions to direct a portion of the concentrate within the bore 71 through the bore 83 and back into the feed water inlet bore 32, while the concentrate orifice member 85 functions to direct the desired amount of concentrate out of the RO system and into the bore 82 for ultimate removal from the system through the concentrate outlet port 24.

The general structure of both the recycle orifice member 84 and the concentrate orifice member 85 are similar to the structure illustrated in FIGS. 7 and 8. For purposes of description, the concentrate orifice member 85 is specifically illustrated in FIGS. 7 and 8; however, it should be noted that the construction of the recycle orifice member 84 is similar. As shown in FIGS. 7 and 8, the concentrate orifice member 85 includes a hexagonal top 85, a pair of externally threaded body portions 88 and 91 which are separated by a cylindrical portion 89, an internal hollowed out recess portion 92 and at least one orifice or opening 90 positioned in the portion 89 for providing communication with the hollowed out interior portion 92.

As shown in FIG. 3, the right hand end of the concentrate bore 71 includes internally threaded portions on either side thereof for receiving the externally threaded portions 88 and 91 of the concentrate port member 85. When the concentrate orifice member 85 is inserted and threadedly received by these internally threaded portions, a pathway for flow of concentrate from the bore 71 is provided through the orifice(s) 90 in the member 85, into and through the hollowed portion 92 (FIG. 8) and into the bore 82. By controlling the size of the orifice(s) 90, together with the number of them, the flow of concentrate from the bore 71 to the bore 82 can be controlled.

Similarly, a portion of the bore 83 on either side of the bore 71 is provided with internal threads for receiving the external threads 88 and 91 of the recycle orifice member 84. Thus, when the member 84 is installed and received by these internally threaded portions, the amount of concentrate which is permitted to be recycled from the bore 71 through the bore 83 and into the feed bore 32 is controlled by the size and number of the orifices 90 of the member 84.

Thus, it can be seen that the size and number of orifices 90 in the recycle orifice member 84 and the concentrate orifice member 85, acting individually, respectively control the amount of concentrate which is recycled and the amount of concentrate which is allowed to leave the system. Also, the sizes and numbers of these orifices 90, acting in conjunction with one another, control the level of pressure which is permitted within the RO module assembly. By increasing the size or number of orifices 90 in the members 84 and 85, the system operating pressure will decrease. Conversely, decreasing the size of, or reducing the number of, orifices 90 in the members 84 and 85 will result in an increase in the system pressure. As shown in FIGS. 3 and 4, the members 84 and 85 are recessed so that the tops do not extend above the top surface of the block 21.

A flush valve port 78 is disposed within the concentrate bore 71 and is connected via the conduits 79 and 81 and the flush valve 80 to the concentrate outlet bore 82 via the port 24. The purpose of this bypass or flush valve 80 is to periodically permit the flushing or cleaning of the RO modules 42 and 44. During extended operation, various particles and impurities build up on the membrane surfaces within the modules. By opening the valve 80, the flow across the membrane surfaces, and thus through the conduit 49 and the bore 71 is dramatically increased. This increased flow flushes the particles and other fouling materials from the surface of the membranes and provides for increased membrane life. In the preferred embodiment the flush valve 80 is a conventional solenoid valve.

A permeate pressure relief valve 68 is provided between the permeate outlet port 26 and the concentrate port 24 via the conduits 66 and 69. This permeate pressure relief valve functions to prevent overpressurizing of the permeate lines which could therefore cause damage to the RO modules.

It should be noted that the conduits connecting the various ports or openings in the block 21 are conventional conduits. Further, conventional connection means are provided between such conduits and ports or openings. In some cases, these connections may be threaded connections, while in other cases the connections may involve a quick connect/disconnect means. In the preferred embodiment, it is contemplated that many of the connections will incorporate a quick connect/disconnect coupling or connector such as the Model LF 3000 tube connectors manufactured by Legris, Incorporated of Rochester, N.Y. It is contemplated, however, that various other connectors and couplings could be used as well.

It should also be noted that to the extent any of the ends of the bores or the ports are not being utilized, they can be sealed off or plugged by appropriate plug means such as the plug 63 in the end of the bore 54, the plug 70 in the end of the bore 71, the plug 34 in the bore 32 and the plug 47 in the bore 54. Similarly, sealing or plugging means can be provided for the permeate inlet ports 50–53 and concentrate inlet ports 74–76 which are not being utilized such as the permeate inlet ports 50 and 51 and the concentrate inlet ports 75 and 76 shown in FIG. 3.

Although the description of the preferred embodiment has been quite specific, it is contemplated that various changes and modifications could be made without deviating from the spirit of the present invention. Accordingly, it is contemplated that the scope of the present invention be dictated by the appended claims, rather than by the description of the preferred embodiment.

We claim:

1. A cross-flow membrane system for separating feed water into a concentrate stream and a permeate stream comprising:

at least one cross-flow membrane module having a permeate outlet and a concentrate outlet;

a flow control manifold block including an elongated feed water bore having a feed water inlet port and a feed water outlet port, an elongated permeate bore having at least one permeate inlet port and a permeate outlet port, an elongated concentrate bore having at least one concentrate inlet port and a concentrate outlet port, a selectively replaceable concentrate pressure control orifice means positioned between said concentrate inlet port and said concentrate outlet for controlling the flow of concentrate from the system and the operating pressure within said module, and a selectively replaceable recycle orifice means connecting said concentrate bore and said feed water bore for controlling the flow of concentrate from said concentrate bore to said feed water bore for recycle, said recycle orifice means being in communication with said concentrate bore at a point upstream from said concentrate pressure control orifice;

means positioned between said feed water outlet port and said cross-flow membrane module for increasing the pressure of said feed water for supply to said membrane module;

conduit means connecting the permeate outlet from said module to said one permeate inlet port; and conduit means connecting the concentrate outlet from said module to said one concentrate inlet port.

2. The system of claim 1 wherein said concentrate orifice means includes a preset concentrate orifice.

3. The system of claim 1 wherein said recycle orifice means includes a preset recycle orifice.

4. The system of claim 3 wherein said concentrate orifice means includes a preset concentrate orifice.

5. The system of claim 1 wherein said elongated permeate bore, said elongated concentrate bore and said elongated feed water bore are disposed generally parallel to one another.

6. The system of claim 5 wherein said elongated permeate bore and said elongated concentrate bore are disposed on opposite sides of said elongated feed water bore.

7. The system of claim 1 wherein said concentrate orifice means includes an elongated member having a pair of spaced, externally threaded portions, a central portion connecting said spaced threaded portions, a hollowed out interior portion opening to an end of said elongated member and at least one orifice extending through said central portion and in communication with said hollowed out interior portion.

8. The system of claim 7 including a first pair of internally threaded portions on opposite sides of said concentrate bore for receiving the externally threaded portions of said concentrate orifice means.

9. The system of claim 7 wherein said concentrate bore includes a first bore portion in communication with said one orifice and a second bore portion in communication with said hollowed out interior portion of said concentrate orfice means.

10. The system of claim 9 wherein said first and second bore portions are generally parallel to one another.

11. The system of claim 1 wherein said recycle orifice means includes an elongated member having a pair of spaced, externally threaded portions, a central portion connecting said spaced threaded portions, a hollowed out interior portion opening to an end of said elongated member and at least one orifice extending through said central portion and in communication with said hollowed out interior portion.

12. The system of claim 11 including a second pair of internally threaded portions on opposite sides of said concentrate bore for receiving the externally threaded portions of said recycle orifice means.

13. The system of claim 1 wherein said permeate outlet port and said concentrate outlet port comprise permeate outlet bores and concentrate outlet bores, respectively, extending through said manifold block in a direction generally orthogonal to said permeate bore and said concentrate bore respectively.

14. The system of claim 1 including a feed water inlet bore extending through said manifold block in a direction generally orthogonal to said feed water bore.

15. The system of claim 14 including conduit means connecting said feed water inlet bore with said feed water inlet port.

16. The system of claim 1 wherein said feed water bore and said permeate bore include an access opening for a monitor probe.

17. The system of claim 1 wherein said manifold block is a generally rectanagular shaped, solid block.

18. The system of claim 1 wherein said cross-flow membrane system is a reverse osmosis system and said module is a reverse osmosis membrane module.

19. A flow control manifold block for use in a cross-flow membrane system for separating feed water into a concentrate stream and a permeate stream, said system having a cross-flow membrane module and means for increasing the pressure of said feed water for supply to said membrane module, said manifold block comprising:

an elongated feed water bore having a feed water inlet port and a feed water outlet port, an elongated permeate bore having at least one permeate inlet port and a permeate outlet port;

an elongated concentrate bore having at least one concentrate inlet port and a concentrate outlet port;

a selectively replaceable concentrate pressure control orifice means positioned between said concentrate inlet port and said concentrate outlet port for controlling the flow of concentrate from the system and the operating pressure within said system; and a selectively replaceable recycle orifice means connecting said concentrate bore and said feed water bore for controlling the flow of concentrate from said concentrate bore to said feed water bore for recycle, said recycle orifice means being in communication with said concentrate bore at a point upstream from said concentrate pressure control orifice.

20. The flow control manifold block of claim 19 wherein said cross-flow membrane system is a reverse osmosis system.

* * * * *